(12) United States Patent
Alabes et al.

(10) Patent No.: US 11,169,823 B2
(45) Date of Patent: Nov. 9, 2021

(54) PROCESS INITIATION

(71) Applicant: Oracle International Corporation, Redwood Shores, CA (US)

(72) Inventors: Tomas Alabes, Foster City, CA (US); Javier Espeche, Foster City, CA (US); Viswanathan Umapathy, Sarasota, FL (US); Nicolas Damonte, Redwood City, CA (US); Suman Ganta, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 242 days.

(21) Appl. No.: 15/440,866

(22) Filed: Feb. 23, 2017

(65) Prior Publication Data

US 2018/0074674 A1  Mar. 15, 2018

Related U.S. Application Data

(60) Provisional application No. 62/395,382, filed on Sep. 16, 2016, provisional application No. 62/395,820, filed on Sep. 16, 2016, provisional application No. 62/395,341, filed on Sep. 15, 2016.

(51) Int. Cl.
*G06F 9/445* (2018.01)
*G06F 16/16* (2019.01)
*G06Q 10/10* (2012.01)

(52) U.S. Cl.
CPC ......... *G06F 9/4451* (2013.01); *G06F 16/168* (2019.01); *G06Q 10/101* (2013.01)

(58) Field of Classification Search
CPC .................. G06Q 10/06316; G06F 9/44505
See application file for complete search history.

(56) References Cited

U.S. PATENT DOCUMENTS

| | | | |
|---|---|---|---|
| 5,956,715 A * | 9/1999 | Glasser | G06F 21/6218 |
| 7,065,493 B1 * | 6/2006 | Homsi | G06Q 10/06 705/7.26 |
| 7,395,222 B1 * | 7/2008 | Sotos | G06Q 10/10 705/7.29 |
| 9,594,602 B1 * | 3/2017 | Davidson | G06F 9/54 |
| 10,038,731 B2 * | 7/2018 | Pearl | H04L 65/403 |
| 2014/0350997 A1 * | 11/2014 | Holm | G06Q 10/06316 705/7.26 |
| 2017/0147296 A1 * | 5/2017 | Kumar | G06F 8/22 |

* cited by examiner

*Primary Examiner* — Alvin H Tan
(74) *Attorney, Agent, or Firm* — Trellis IP Law Group, PC

(57) ABSTRACT

Implementations generally relate to initiating processes. In some implementations, a method includes receiving, at a server, an object from a client device. The method further includes determining an instance of a process initiation event, where the process initiation event triggers a process to initiate, and where the process initiation event is based on the object and one or more process initiation policies. The method further includes initiating the process upon the determining of the process initiation event.

14 Claims, 13 Drawing Sheets

PROCESS INITIATION

CROSS REFERENCES TO RELATED APPLICATIONS

This application claims priority from U.S. Provisional Patent Application Ser. No. 62/395,382, entitled DOCUMENT AND FOLDER INITIATED PROCESSES, filed on Sep. 16, 2016, U.S. Provisional Patent Application Ser. No. 62/395,820, entitled START PROCESSES FROM A FORM, filed on Sep. 16, 2016, and U.S. Provisional Patent Application Ser. No. 62/395,341, entitled SYSTEM FOR PROCESS CLOUD SERVICE, filed on Sep. 15, 2016, which are hereby incorporated by reference as if set forth in full in this application for all purposes.

BACKGROUND

Efficient, adaptable, and insightful management systems and methods can be particularly important in enterprise applications, where accurate management and informed decision making can enhance enterprise profits. Some management systems improve corporate performance by managing and optimizing a company's processes. Such systems enable organizations to be more efficient and effective.

SUMMARY

Implementations described herein provide techniques for initiating processes. In some embodiments, a non-transitory computer-readable storage medium carries one or more sequences of program instructions thereon. When executed by one or more processors, the instructions cause the one or more processors to perform operations including receiving, at a server, an object from a client device; determining an instance of a process initiation event, where the process initiation event triggers a process to initiate, and where the process initiation event is based on the object and one or more process initiation policies; and initiating the process upon the determining of the process initiation event.

In some implementations, an apparatus includes one or more processors, and includes logic encoded in one or more non-transitory computer-readable storage media for execution by the one or more processors. When executed, the logic is operable to perform operations including causing one or more documents and one or more folders to be displayed in a workspace region in a user interface of a client device; detecting a first document of the documents being received at a first folder one of the folders; determining an instance of a process initiation event, where the process initiation event triggers a process to initiate, and where the process initiation event is based one of the first document and the first folder and based on one or more process initiation policies; and initiating the process upon the determining of the process initiation event.

A further understanding of the nature and the advantages of particular embodiments disclosed herein may be realized by reference of the remaining portions of the specification and the attached drawings.

DETAILED DESCRIPTION OF EMBODIMENTS

Figure 1:
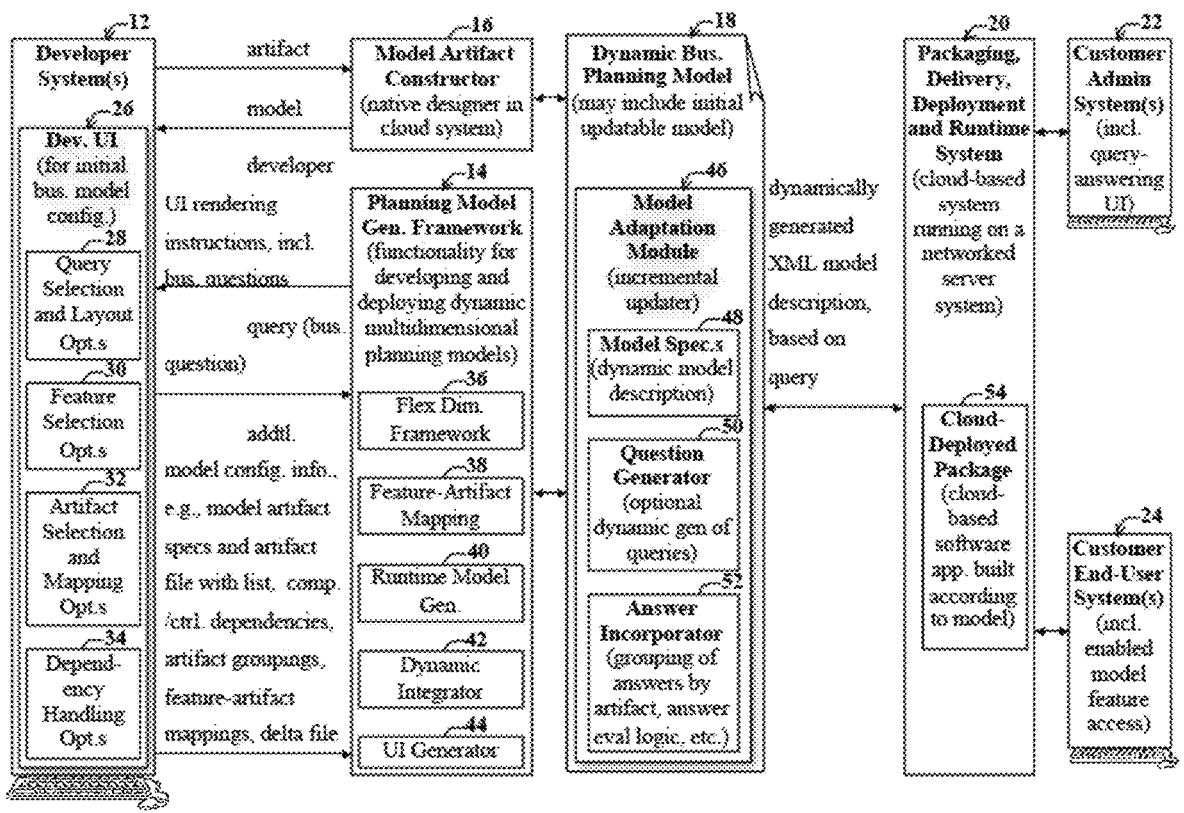
FIG. 1 illustrates an example block diagram of a system, which may be used for implementations described herein.

Implementations described herein provide techniques for initiating processes. As part of an integration between a document cloud service (DCS) and a process cloud service (PCS), processes can be initiated when a document or folder is received. Implementations enable users such as designers or developers to model document or folder initiated processes that implement a particular process for the received asset by customizing its management.

In some implementations, a method includes receiving, at a server, an object from a client device. The method further includes determining a process initiation event, where the process initiation event is based on one or more process initiation policies. The method further includes initiating a process associated with the process initiation event upon the determining of the process initiation event.

Implementations enable users to design and run form-centric processes. Users can design their forms from scratch and trigger their processes with their forms. The form metadata can be used to model the process flow.

In some implementations, a method includes providing, at a client device, a form, where the form includes one or more control buttons, and where one of the control buttons is an activation control button. The method further includes detecting when a user selects the activation control button. The method further includes initiating a process in response to the user selecting the activation control button.

In various implementations, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature (e.g., stored or arranged data) that is provided via computer code (e.g., software). Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

In various implementations, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen that is generated by a networked software application and that is accessible via a browser may be called an application page (or simply page) herein. A UI component may be an application page or collection of related or linked pages.

An enterprise computing environment may be any collection of computing resources of an organization used to perform one or more tasks involving computer processing. An example enterprise computing environment includes various computing resources distributed across a network, and may further include private and shared content on intranet web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include human resources (HR) (e.g., enterprise personnel), financial resources, assets, employees, business contacts, sales data, and so on, of an enterprise. Examples of enterprise software include enterprise resource planning (ERP) software for facilitating managing enterprise activities (e.g., product planning, inventory management, marketing, sales, and so on). Example ERP applications include customer relationship management (CRM), human capital management (HCM), business intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Note that conventionally, while certain financial tools, tables, and so on (e.g., balance sheets, cash flow statements, etc.), are standardized, different companies may prefer to maintain and view operational and financial planning data and tasks differently, e.g., in accordance with different business and computing environment requirements. This can be particularly true at granular levels, i.e., where detailed enterprise data must be observed and analyzed in accordance with business planning objectives.

For example, a particular service company may experience substantial compensation expenses (e.g., payments to employees, contractors, etc.), which may represent the primary driver for expense planning. Similarly, a small consulting company may experience substantial travel expenses, which may represent a primary driver for expense planning. Accordingly, two different service companies may base their expense planning on substantially different drivers.

Similarly, different companies may employ different methods of accounting, e.g., a direct method or indirect method of accounting. Accordingly, different companies may rely upon different drivers for handling accounting details.

Furthermore, the granularity of planning (i.e., the level of detail demanded or required) may vary across different companies and/or business types, segments, or other domains. For example, a fast moving consumer goods company may plan revenue by product, market, channel, and segment, whereas an information technology (IT) company may plan revenue by service, market, and customers. Accordingly, different companies may rely upon different drivers for various types of planning.

In addition, while certain companies may prefer to perform business planning using a collection of standard or common drivers and associated software modules and functionality (e.g., standard labor, material, etc.), other companies may prefer to perform direct entry for project expenses, revenue, etc.

Accordingly, different businesses may have different planning requirements or needs, which can be difficult to meet using conventional static business planning modules and associated software applications. Certain implementations discussed more fully below provide systems and accompanying mechanisms and methods for enabling dynamic adaptation of an existing initial business planning model (which may be called a seed model herein), thereby enabling the initial seed planning model to uniquely grow to meet the individual or specific needs of a given business or organization.

For clarity, certain well-known components, such as hard drives, processors, operating systems, power supplies, routers, Internet service providers (ISPs), identity management systems, workflow orchestrators, process schedulers, integration brokers, tenant automation systems (TASs), online analytical processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 illustrates an example block diagram of a system 100, which may be used for implementations described herein. In various implementations, system 100 is an enterprise-computing environment configured to enable initial development of a dynamic business planning model 18. In various implementations, system 100 incrementally updates business planning model 18 to meet specific enterprise needs, and uses resulting updated business planning model 18 as part of a cloud-based enterprise software application or service 54 (labeled "Cloud-Deployed Package"). While system 100 performs implementations described herein, in other implementations, any suitable component or combination of components associated with system 100 or any suitable module or module s associated with system 100 may facilitate performing the implementations described herein. In various implementations, system 100 may not have all of the components shown and/or may have other elements including other types of modules instead of, or in addition to, those shown herein.

System 100 includes a developer computer system 12 (labeled "Developer System(s)") that is in communication with a planning model generation framework 14 and a model artifact constructor 16. Computer system 12 may also be referred to herein as the developer system or the developer computer. Model artifact constructor 16 may leverage preexisting functionality, e.g., as may be available via a native designer in a cloud computing system implemented as part of system 100.

Planning model generation framework 14 and model artifact constructor 16 that are leveraged to develop business planning model 18, may further communicate with a packing, delivery, deployment and runtime system and/or computing framework 20 (labeled "Packaging, Delivery, Deployment and Runtime System"). Modules 14-20 may be hosted in a cloud, i.e., a server system accessible via a network, such as the Internet.

A cloud-deployed package 54, i.e., software application, embodying business planning model 18 is may be hosted in the cloud, i.e., cloud-based. For the purposes of the present discussion, cloud-based software may be any software run on one or more servers and accessible to client systems via a network used to communicate with the software.

In some implementations, cloud-deployed package 54 may represent a software application that may provide one or more web services for use by other software applications, and/or may provide cloud-services, e.g., on a subscription basis, to one or more client systems, e.g., a customer administrator system 22 (labeled Customer Admin System (s), and a customer end-user system 24 (labeled Customer End-User System(s). For the purposes of the present discussion, the term "customer" refers to any user, such as an administrator and/or end user, e.g., who may be part of an organization that has access to cloud-deployed package 54.

In some implementations, a developer system 12 accesses model artifact constructor 16 and planning model generation framework 14 via a network, such as the Internet. Developer system 12 may include a browser used to browse to the network address that provides access to functionality provided by model artifact constructor 16 and planning model generation framework 14.

After browsing to a network address allotted for system developers, designers, and/or other qualified personnel, various dynamic model-building functionality is accessible to the developer system, e.g., via various developer UI display screens 26 (labeled "Dev. UI").

Software functionality may be any function, capability, or feature, e.g., stored or arranged data, that is provided via computer code, e.g., software. Generally, software functionality may be accessible via use of a UI, and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

Software functionality, or a set of software functionalities, that is/are associated with or used by a business planning model, is called a model feature (or simply feature) herein. Examples of features include, but are not limited to, software functionality for implementing indirect cash flow statements, income statements, and so on.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software. The terms UI control and UI component (or simply component) may be employed interchangeably herein.

A descriptor or characteristic of a business planning model and/or associated UI display screens and/or UI layout, is called a model artifact (or simply artifact) herein. Examples of model artifacts include, but are not limited to metadata (e.g., metadata describing a UI layout or UI model framework), dashboards, business rules, forms, dimensions, and so on.

Artifacts may represent or be associated with categories of features or software functionality. When functionality is associated with a business model artifact, the artifact may be seeded with one or more functionalities or features.

Artifacts and features may be dependent or independent. A dependent artifact or feature is one that relies upon the existence or operation of another artifact or feature for proper functioning. Similarly, an independent artifact or feature may be added to a model without requiring special handling of interdependencies, as discussed more fully below. Examples of potential dependent artifacts include, but are not limited to composite forms, rule sets, and so on.

A valid artifact may be any artifact that may be associated with (e.g., seeded with) one or more features that are available for a business planning model. The availability of a feature to an artifact may be defined in initial business planning model 18, e.g., by a developer using business planning model designer software represented by planning model generation framework 14 and model artifact constructor 16 of FIG. 1.

In some implementations, developer UI display screens 26 include a query-selection UI display screen (and/or set of UI controls) 28, a feature-selection UI display screen 30, an artifact-selection UI display screen 32 (labeled "Artifact Selection and Mapping Opts," and an artifact and feature dependency handling UI display screen 34.

Planning model generation framework 14 includes a flex-dimension framework 36, a feature-artifact mapping module 38, a runtime model generator 40, a dynamic functionality integrator 42, and a UI generator 44.

Generated, dynamic, business planning model 18, which may be defined by and/or specified via an extensible markup language (XML) document, includes a specification 48 (labeled "Model Specs") of business planning model 18, and optionally, embedded question generator code (or a link to code) 50 and answer incorporator 52, e.g., for facilitating incorporating answers to business questions, as may be provided via the customer administrator system 22 (labeled "System(s)," as discussed more fully below.

Packaging, delivery, deployment, and runtime system 20 hosts and runs deployed cloud-based software package or application 54, also referred to as "cloud-deployed package"

54. Functionality of deployed application 54, also referred to as "cloud-deployed package 54," is accessible to customer end-user client system 24.

Note that in general, groupings of various modules of system 100 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, a question generator 50 and answer incorporator 52 shown as part of dynamic business planning model 18 may instead, or in addition, be incorporated into planning model generation framework 14.

Furthermore, certain modules of planning model generation framework 14 may be implemented client-side, e.g., on developer system 12. In general, certain server-side, i.e., cloud-based modules (e.g., running on a server or server system) may be implemented client-side (e.g., running on a client computer communicating with a server), and vice versa, in a manner different than shown in FIG. 1.

In an example scenario, a business model developer (also called designer herein) employs developer system 12, e.g., artifact-selection screen 32, to specify, access, and/or configure model artifacts, leveraging model artifact constructor 16. Artifact-selection screen 32 presents one or more UI controls (which may provide so-called user options, or simply options) for facilitating developer construction, selection, and configuration of model artifacts, as well as UI controls enabling configuration and/or specification of mappings and/or rules associated with the artifacts. The mappings discussed herein refer to associations between business model artifacts and features, and are also called feature-artifact and/or artifact-feature mappings.

After developing and/or configuring a set of one or more business model artifacts, e.g., by leveraging artifact-selection screen(s) 32 and associated model artifact constructor 16, the resulting artifacts may be stored locally or via the server system that hosts modules 14-20.

Next, in the present example scenario, the developer employs feature-selection screen 30 to select and/or configure a set of business model features. Feature construction and/or selection may also be facilitated via model artifact constructor 16 and/or code run as part of planning model generation framework 14, e.g., via code run on feature-artifact mapping module 38.

After initial selection and/or configuration of a set of one or more model artifacts and one or more model features, the developer may employ one or more UI controls of artifact-selection screen 32 to configure and/or specify initial mappings and/or associated mapping rules that define associations between the configured artifacts and features.

Artifact-selection and mapping screen 32 may include UI controls that leverage the functionality of feature-artifact mapping module 38 of planning model generation framework 14. Feature-artifact mapping module 38 may include additional code for implementing automatic feature-artifact mappings in accordance with groupings of business questions and/or answers to the business questions, e.g., so as to automatically update dynamic business planning model 18, as discussed more fully below.

UI generator 44 of planning model generation framework 14 includes code for generating rendering instructions to render developer-side UI display screens 26, and further includes code for generating rendering instructions for UI display screens of cloud-deployed package 54, which are exposed to customer end-user system 24.

Developer-side query-selection and layout options screen 28 includes UI controls and access to associated functionality for defining, selecting, and/or grouping business questions (called queries) to be exposed in a UI display screen accessible to customer administrator system 22. The UI display screens are displayed as part of the dynamic business planning model 18 and are exposed to the customer administrator system 22, and include a UI display screen (an example of which is shown in FIGS. 3, 5, 6, 7, 8, and 9) that lists business questions that have been enabled for existing dynamic business planning model 18.

The initial business questions selected by a developer using query-selection and layout options screen 28 may be listed and/or otherwise formatted in accordance with developer-selected layout options provided via query-selection and layout options screen 28. UI controls of query-selection and layout options screen 28 provide developer-access to associated functionality (e.g., functionality which may be provided via UI generator 44 and feature-artifact mapping module 38 and/or other modules of planning model generation framework 14) for defining, selecting, and/or otherwise configuring business questions and how the questions will be laid out in a UI display screen exposed to a customer administrator, e.g., via customer administrator system 22.

Mappings of artifacts are grouped by business question or by business question group or type. Mappings of artifacts to features may depend, in part, on the business questions established via use of query-selection and layout options screen 28.

The developer may further specify dependency-handling options via one or more UI controls provided in dependency-handling options screen 34. The dependencies may include dependencies between business questions (e.g., in cases where the answer to one business question may affect other questions or answers, and dependencies between different artifacts (and/or groups or types of artifacts), and dependencies between different features (and/or groups or types of features). Such dependencies may require that a change (e.g., difference) in one question, artifact, and/or feature, be propagated to another question, artifact, and/or feature.

Various implementations discussed herein may employ difference or delta processing to ensure that dependencies are handled without introducing conflicts. This involves referencing the established associations and associated selected configuration options (e.g., as may be specified by a developer via dependency-handling options screen 34) and making adjustments to the business model based thereon and in response to a detected change in an artifact, feature, question, etc.

Accordingly, developer system 12 forwards business question selections and associated identifications, descriptions, and/or configuration information (e.g., as may be provided responsive to developer manipulation of query-selection and layout options screen 28) to business planning model generation framework 14. In addition, various additional UI controls included among developer UI display screens 26 may enable specification and forwarding of additional information to planning model generation framework 14, including, but not limited to additional business model configuration information, e.g., model artifact specifications, an artifact file listing artifacts for an initial business planning model, component (e.g., UI control) dependencies (between UI controls to be rendered and exposed via cloud-deployed package 54), artifact grouping information, feature-artifact mapping data, delta file specifications (e.g., describing dependencies between various questions, artifacts, and/or features), feature specifications, flex dimension configuration parameters and/or specifications, and so on.

Business planning model generation framework 14 then processes the inputs received via developer system 12 to automatically construct an initial business planning model, also called the seed model. Some example modules usable to construct initial dynamic business planning model 18 and to implement incremental updates thereto, include, but are not limited to flex dimension framework 36, feature-artifact mapping module 38, runtime model generator 40, dynamic integrator 42, and UI generator 44.

Flex dimension framework 36 includes computer code for enabling customer administrators (e.g., using customer administrator system 22) and/or customer end users (e.g., using customer end-user system 14) to add flex dimensions to various UI display screens exposed via cloud-deployed package 54. Flex dimension framework 36 then enables extension of business planning model 18 in accordance with the added flex dimensions. Note that whether initial business planning model 18 supports flex dimensions, which flex dimensions, if any, are supported, and behaviors of the flex dimensions, may be specified by a developer via one or more UI controls provided in developer UI display screens 26.

Feature-artifact mapping module 38 includes computer code for enabling automatic implementation of changes introduced to dynamic business planning model 18 in response to answers provided in response to business questions posed to an administrator (or other authorized user) of customer administrator system 22. In particular, when an administrator provides a new answer to a question (e.g., which may be posed via a UI prompt, such as a check box), any artifacts associated with the question are then automatically populated with features via feature-artifact mapping module 38. The resulting populated artifacts are then incorporated into updated dynamic business planning model 18 after any artifact and/or feature dependencies are handled and/or deltas are processed.

Runtime model generator 40 includes computer code for automatically generating a new or updated dynamic business planning model 18 for incorporation into cloud-deployed package 54. The updates to running cloud-deployed package 54 by runtime model generator 40 may be implemented via patching and/or other known technologies for adjusting running software applications.

Dynamic integrator 42, which may communicate with other modules of planning model generation framework 14, facilitates implementing delta differencing processing to accommodate newly added functionality without introducing conflicts in updated business planning model 18. Integrator 42 may further include computer code for facilitating and/or ensuring efficient interoperability between different intercommunicating business planning models and associated software applications deployed via packaging, delivery, deployment, and runtime system 20.

Note that information exchange between developer system 12 and between various cloud-based modules 14-20 may be implemented via exchange of XML files that are also transferred between the system and modules. Furthermore, dynamic business planning model 18 may be implemented substantially via an XML document defining the model.

In some implementations, dynamic business planning model 18 includes a model adaptation module 46, which includes computer code for facilitating some self-adaptation of dynamic business planning model 18. Note that in other implementations, model adaptation module 46 may be included instead in planning model generation framework 14.

In some implementations, model adaptation module 46 includes, in addition to a description of the business planning model (including a description of existing questions, artifacts, and associated features), a specification of code for dynamic question generator 50 and answer incorporator 52.

Dynamic question generator 50 may include computer code (and/or links thereto) for automatically adjusting a list of business questions exposed via a UI of customer administrator system 22, e.g., in response to one or more answers provided thereby by an administrator using customer administrator system 22. This may be particularly useful for reconfiguring listing of displayed questions in response to an answer to a question that affects the validity of other questions displayed in (or to be displayed among) the listing of business questions.

Answer incorporator 52 may include computer code (and/or links thereto) for adjusting groupings of artifacts by answers and/or answer type or category. Answers to the business questions may be evaluated by evaluation logic to determine how a new listing of questions should be generated and laid out (in the UI exposed to the customer administrator system 22).

Note that various modules 36-44 of the business planning model generation framework 14 may intercommunicate, e.g., via interfacing functionality incorporated therein. Similarly modules 48-52 of model adaptation module 46 of dynamic business planning model 18 may intercommunicate.

Once initial business planning model 18 is developed and/or configured via developer system 12, it can be deployed as cloud-deployed package 54, which is then made available to customer administrator system 22 and customer end-user system 24. The customer administrator may then use customer administrator system 22 to answer business questions. The resulting answers then feed back to framework modules 14-20, which then adapt or update dynamic business planning model 18 in accordance with the answers. The adjustment to dynamic business planning model 18 is effectuated through use of artifacts, which are then mapped or seeded with features corresponding to the answered questions, and in accordance with the answers to the answered questions, as discussed more fully below.

Accordingly, the present example implementation may enable customers to substantially forgo, configuring and/or updating business planning software. Several business planning processes (which may be associated with different business planning models and/or sub-models) may be selectively and incrementally rolled out to customer end users (e.g., users of customer end-user system(s) 24). Furthermore, integration between added features (e.g., sets of software functionality associated with different business processes) is automatically accommodated, e.g., via dynamic integrator 42 and feature-artifact mapping module 38 of business planning model generation framework 14.

Furthermore, by enabling customer addition of and configuration of flex dimensions to dynamic business planning model 18, the resulting automatically handled dimensions can significantly reduce implementation time for customers to implement new features and associated business model artifacts.

Customers now have significant flexibility and options for configuring various planning business processes. Customers can leverage these configuration capabilities, reduce implementation time, and continue building the model over time, as necessary to meet the needs of the customer organization.

Furthermore, business planning models developed and deployed using system 100 may now readily evolve and adapt to meet different and/or changing business needs while remaining consistent with industry-standard best practices. Furthermore, as best practices change, dynamic business planning model 18 may adapt to comply with the new best practices.

Figure 2:
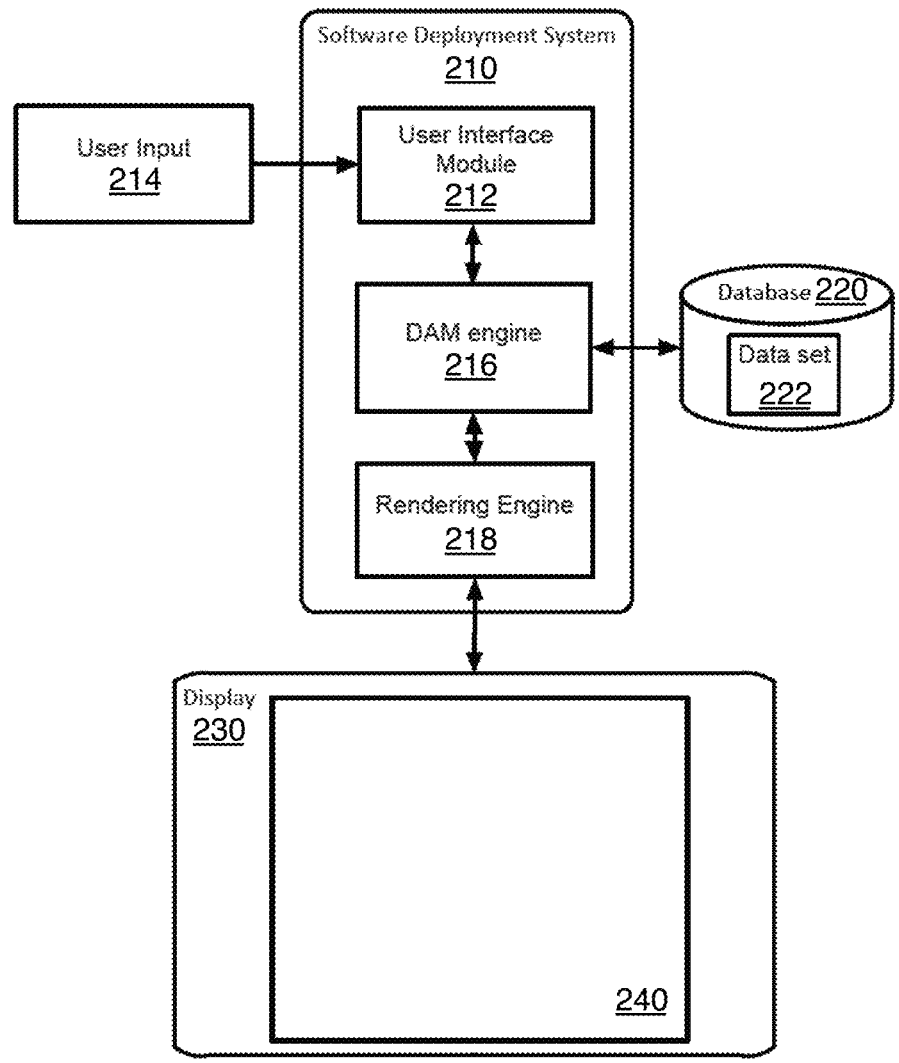
FIG. 2 illustrates an example block diagram of a computing system, which may be used for implementations described herein.

FIG. 2 illustrates an example block diagram of a computing system 200, which may be used for implementations described herein. Computing system 200 provides an interface layer, such as an application program interface (API). The interface layer provides users with seamless connectivity between different instantiations of an application located in different environments (e.g., development environment, production environment, etc.). Computing system 200 may be any computing system, such as an enterprise computing environment, client-server system, and the like.

Computing system 200 also includes software management system 210, also referred to herein as software deployment system 210. Software management system 210 may include a user interface module 212. User interface module 212 may be configured to receive and process data signals and information received from a user interface 214, also referred to herein as user input 214. For example, user interface module 212 may be adapted to receive and process data from user input associated with data for processing via software management system 210. Software management system 210 is configured to process data received from user interface 214, such as a keyboard, mouse, etc. for receiving user input.

Software management system 210 may also include a process engine 216, also referred to herein as digital asset management (DAM) engine 216, and a rendering engine 218. Process engine 216 may be configured as an API or any interface or data structure that may be used to advantage.

In some implementations, computing system 200 may include a data source such as database 220. Database 220 may be connected to the software management system 220 directly or indirectly, for example via a network connection, and may be implemented as a non-transitory data structure stored on a local memory device, such as a hard drive, solid state drive (SSD), flash memory, and the like, or may be stored as a part of a cloud network, as further described herein.

Database 220 may contain one or more data sets 222. Data sets 222 may include data as described herein. Data sets 222 may also include data pertaining to data attributes, data hierarchy, nodal positions, values, summations, types of charts of visualizations, algorithms, code (e.g., C++, Javascript, JSON, etc.), source, security, hashes, XML, and the like. In addition, data sets 222 may also contain other data, data elements, and information such as metadata, labels, development-time information, run-time information, configuration information, API, interface component information, library information, pointers, and the like.

In various implementations, software management system 210 is connected to a display 230 configured to display data 240 (e.g., graphical data, etc.), for example, to a user thereof. Display 230 may be a passive or an active display, adapted to allow a user to view and interact with display data 240 displayed thereon, via user interface 214. In other configurations, display 230 may be a touch screen display responsive to touches, gestures, swipes, and the like for use in interacting with and manipulating display data 240 by a user thereof. Gestures may include single gestures, multi-touch gestures, and other combinations of gestures and user inputs adapted to allow a user to convert, model, generate, deploy, and maintain display data 240.

In various implementations, process engine 216 may be adapted to receive data from user interface 214 and/or database 220 for processing thereof. In one configuration, process engine 216 is a software engine configured to receive and process input data from a user thereof pertaining to display data 240 from user interface 214 and/or database 220 in order to provide the process API layer.

Process engine 216 in other implementations may be configured as a data analysis tool to perform analysis functions associated with display data 240. Such analysis functions may include determining attributes associated with the data, partitions, local and remote pods (layers), communication protocols, determining the relationships to other data, interpreting metadata associated with the data, and the like. For example, process engine 216 may be configured to receive and analyze data sets 222 to determine user interface configuration, data processing instructions, data attributes, data hierarchy, nodes, nodal positions within the hierarchy, values, summations, algorithms, source, security, hashes, and the like, associated with data sets 222.

Process engine 216 may receive existing data sets 222 from database 220 for processing thereof. Such data sets 222 may include and represent a composite of separate data sets 222 and data elements pertaining to, for example, organizational data, which may include employment data, salary data, personnel data, and the like. In addition, data sets 222 may include other types of data, data elements, and information such as contact data, sales data, production data, scientific data, financial data, medical data, census data, and the like.

Rendering engine 218 may be configured to receive configuration data pertaining to display data 240, associated data sets 222, and other data associated with display data 240 such as user interface components, icons, user pointing device signals, and the like, used to render display data 240 on display 230. In one exemplary implementation, rendering engine 218 may be configured to render two-dimensional (2D) and three-dimensional (3D) graphical models and simulations to allow a user to obtain more information about data sets 222. In one implementation, upon receiving instruction from a user, for example, through user interface 214, rendering engine 218 may be configured to generate a real-time display of interactive changes being made to display data 240 by a user thereof.

Note that the computing system 200 presents a particular example implementation, where computer code for implementing embodiments may be implemented, at least in part, on a server. However, embodiments are not limited thereto. For example, a client-side software application may implement software management system 210, or portions thereof, in accordance with the present teachings without requiring communications between the client-side software application and a server.

Figure 3:
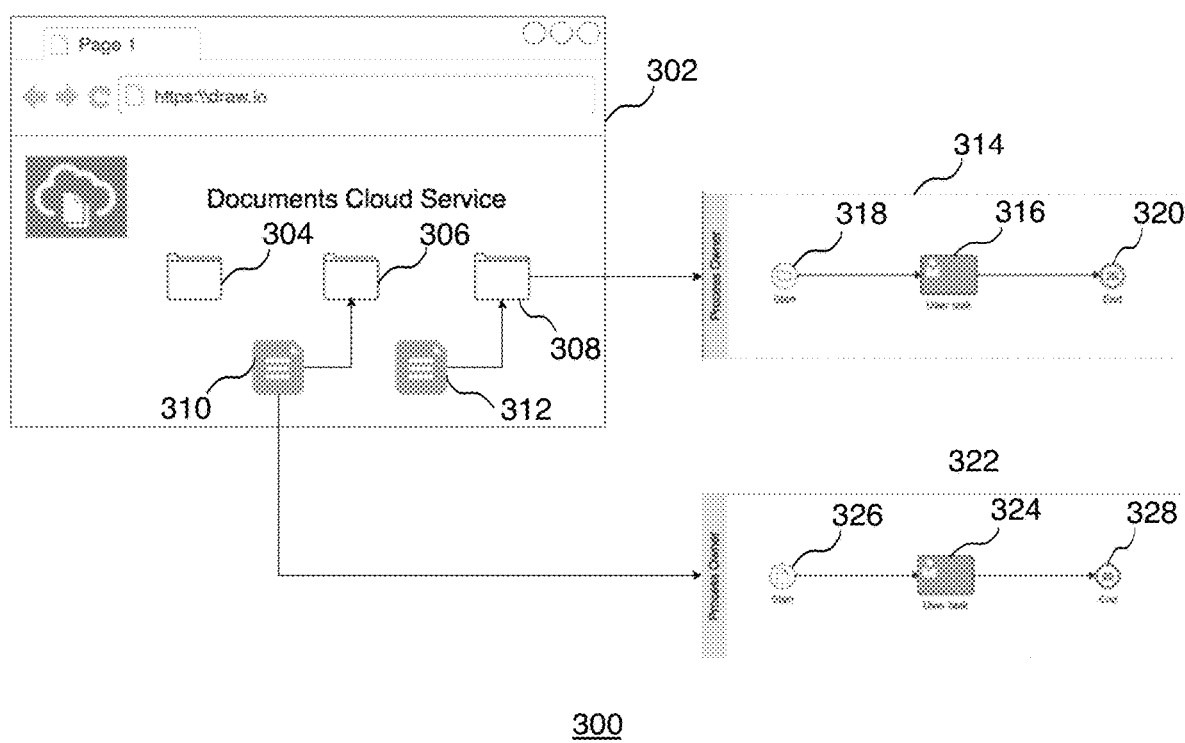
FIG. 3 illustrates an example user interface environment, according to some implementations.

FIG. 3 illustrates an example user interface environment 300, according to some implementations. User interface environment 300 includes a user interface 302. In various implementations, the system enables or causes one or more documents and one or more folders to be displayed in a workspace region in user interface 302 of a client device. For example, user interface 302 shows folders 304, 306, and 308, as well as documents 310 and 312. Either document 310 or 312 could be any document or file that the system receives from a user via a client device. For example, either document 310 or 312 could be a form that the user has filled out. In various implementations, user interface 302 is a user interface at a client device, and may be a web browser interface. In various implementations, user interface 302 may be provided to an end user (e.g., a loan applicant or a loan officer) via packaging, delivery, deployment and runtime system 20 of FIG. 1 and displayed on customer admin system 22 and/or customer end-user system 24 of FIG. 1. User interface 302 may also be provided to an end user via software deployment system 210 of FIG. 2.

As described in more detail herein, different processes may be initiated based on activity involving either one of the folders 304, 306 and 308 and/or one of the documents 310 and/or 312. For example, the system may detect a document being received at a folder. This may occur if a user drags and drops the document in the folder. As described in more detail herein, the system initiates a process upon the determining of a process initiation event, where the process initiation event triggers a process to initiate. In various implementations, the process initiation event is based on one or more process initiation policies, which are described in more detail herein.

Also shown is a process 314, which includes process elements 316, 318, and 320. In this example process, process element 316 is a task node, process element 318 is a start node, and process element 320 is an end node. In some implementations, process element 318 and process element 320 define respective starting and ending points of process 314. In various implementations, process element 318 and process element 320 may be types of event process elements. Event process elements may include start and end elements, which define respective starting and ending points of a process, and intermediate events that can either occur within the typical flow of a process or trigger an interruption with a process. As described in more detail herein, start elements may include document start process elements, folder start process elements, form start process elements, and message start process elements.

Document start process elements trigger a process instance when a document is received. Folder start process elements trigger a process instance when a folder is received. Form start process elements trigger a process instance when a user submits a form. Message start process elements trigger a process instance when an email message is received. Another type of start element is referred to as a none start process element. A none start process element is used when no instance trigger is defined, such as when a process instance is created by another flow element. A none start process element may be used as a placeholder when the start event is not known.

Also shown is a process 322, which includes process elements 324, 326, and 328. In this example process, process element 324 is a task node, process element 326 is a start node, and process element 328 is an end node.

In various implementations, processes 314 and 322 may be created by a user such as a developer using planning model generation framework 14 of FIG. 1 and/or software deployment system 210 of FIG. 2.

Figure 4:
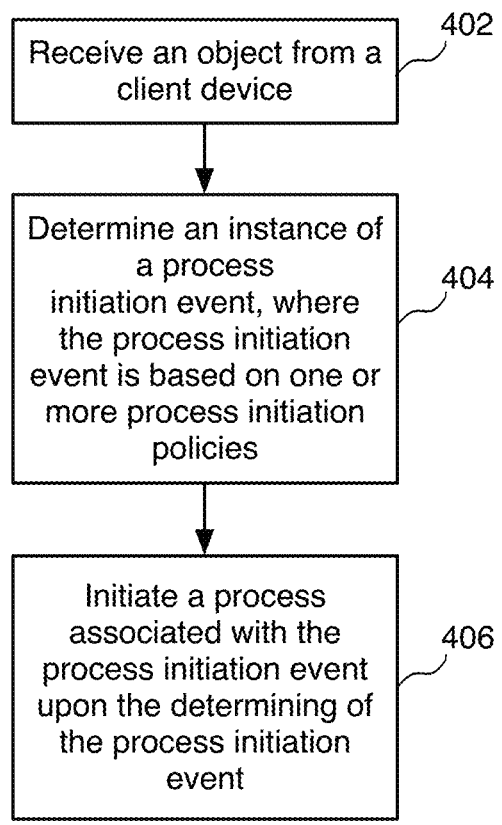
FIG. 4 illustrates an example flow diagram for initiating a process, according to some implementations.

FIG. 4 illustrates an example flow diagram for initiating a process, according to some implementations. Referring to both FIGS. 3 and 4, a method is initiated at block 402, where a system such as a server receives an object from a client device. In some implementations, the object may be a document such as document 310 or 312. In some implementations, the object may be a folder. In various implementations, the receipt of the object may include a user creating an object on the client device or downloading the object to the client device and the sending the object to the server. In various implementations, the system enables or causes objects such as documents and folders to be displayed in a workspace region in the user interface of the client device as shown in FIG. 3. As described herein, a user may drag and drop objects such as documents in folders. A user may also drag and drop objects such as folders into other folders. The system detects when a particular object is receives at a particular folder.

At block 404, the system determines an instance of a process initiation event, where the process initiation event triggers a process to initiate, and where the process initiation event is based on the object (document, folder, etc.) and one or more process initiation policies. In various implementations, the particular process initiation event may be selected by a user such as a developer who created the process. As described in more detail herein, there may be different types of initiation events, or start events. For example, there may be a folder start event in a folder-initiated process, a document start event in a document-initiated process, a form start event in a form-initiated process, and others. Example implementations of these start events are described in more detail herein.

In some implementations, one or more of the process initiation policies may include initiating a process if any object is received at a predefined process initiating folder, where the predefined process initiating folder is configured to initiate the process when the process initiating folder receives any object. As such, in some implementations, the process initiation event is an object being received at a predefined process initiating folder. This may be referred to as a folder start event in a folder-initiated process, which triggers a process instance when any object is received at a process initiating folder. In various implementations, an object may be a document, folder, or a folder of documents.

For example, referring to FIG. 3, in this example scenario, folder 308 is a process initiating folder. As such, in some implementations, any object (e.g., document, folder, etc.) being received at folder 308 is a process initiation event.

In some implementations, a folder start event has a defined list of parameters, such as the folder identification, type (e.g., where "f" stands for folder), and folder name. Such parameters may be saved in data objects to be read as folder metadata.

In some implementations, if a process is a folder-initiated process, the user may configure who (e.g., which end user(s)) may access that folder. The user may also configure what the person accessing the folder may do with the folder.

In some implementations, one or more of the process initiation policies may include initiating a process if an object is a predefined process initiating file and is received at any folder. As such, in some implementations, the process initiation event is the object being a predefined process initiating file and being received at any folder. This may be referred to as a document start event in a document-initiated process, which triggers a process instance when an object that is a process initiating file is received at any folder.

For example, referring to FIG. 3, in this example scenario, document 310 is a process initiating file. As such, the event of document 310 being received at any folder such as folder 306 is a process initiation event.

In some implementations, a document start event has a defined list of parameters, such as the document identification, type (e.g., where "d" stands for document), and document name. Such parameters may be saved in data objects to be read as document metadata.

In some implementations, if a process is a file-initiated process, the user may configure who (e.g., which end user(s)) may access that file. The user may also configure what the person accessing the file may do with the file.

In some implementations, with either a process initiating folder and process initiating file scenario, a process is triggered when a file is dropped into a specific folder chosen by the user who developed the process in a documents cloud service (DCS).

In some implementations, one or more of the process initiation policies may include initiating a process if a user selects an activation control button on a form. Example implementations directed to a process initiation event where a user selects an activation control button on a form are described in more detail herein.

At block 406, the system initiates the process upon the determining of the process initiation event. Referring to FIG. 3, in this example scenario, because folder 308 is a process initiating folder and receives document 312, process 314 is initiated. As shown, when document 312 is dropped into folder 308, process 314 is initiated. As described herein, process 314 includes process elements 316, 318, and 320, where process element 316 is a task node, process element 318 is a start node, and process element 320 is an end node.

Referring to FIG. 3, in this example scenario, document 310 being a process initiating file and being received at folder 306 is a process initiation event. As shown, when document 310 is dropped into folder 306, process 322 is initiated. As described herein, process 322 includes process elements 324, 326, and 328, where process element 324 is a task node, process element 326 is a start node, and process element 328 is an end node.

In an example implementation, a given document such as document 312 may be a contract. When dropped into folder 308 (which may be a contracts folder, for example), start node 318 of process 314 may be triggered. Task node 316 may notify a user to open and read document 312.

In another example implementation, a given document such as document 310 may be a loan application. When document 310 is dropped into any folder, start node 326 of process 322 may be triggered. Task node 324 may notify a user to process document 310.

In another example implementation, if a given folder is dropped into folder 308, a process may open the dropped folder to review the contents.

In some implementations, permissions may be defined for a given process initiation file or process initiation folder. For example, in some implementations, the system may enable a user to set permissions as to who can drag an drop a particular process initiating file into a folder. In some implementations, the system may enable a user to set permissions as to who can drag an drop an object into a particular process initiating folder. In some implementations, the system may enable a user to set permissions as to who may open a given file or folder. In another example, in some implementations, the system may enable a user to set permissions as to who can download a given file or folder. In some implementations, permissions may be stored at the server, at data storage device 1230 of FIG. 12, or database 220 of FIG. 2, or any other suitable storage location.

In some implementations, if a process initiating document is dropped into a process initiating folder, a policy may determine with process is initiated. For example, if a process initiating document is dropped into a process initiating folder, a policy may be such that the process associated with the process initiating folder is initiated, but not the process associated with the process initiating document.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 5:
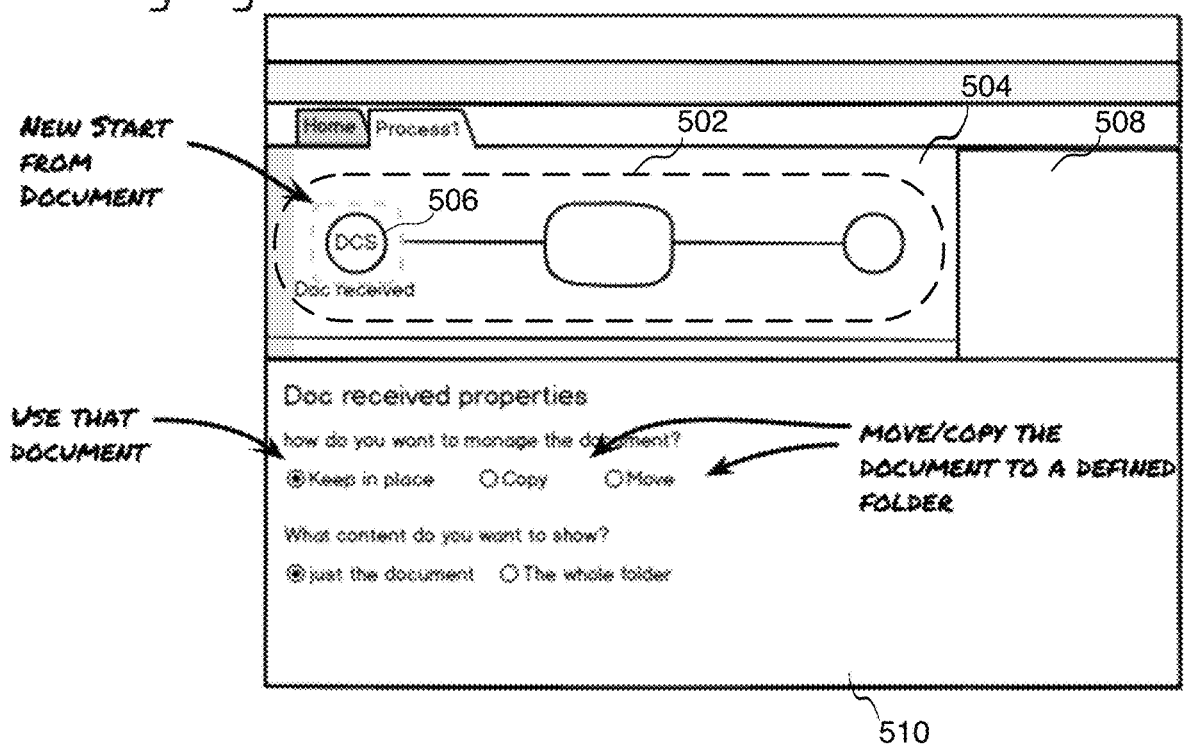
FIG. 5 illustrates an example user interface, according to some implementations.

FIG. 5 illustrates an example user interface 500, according to some implementations. In various implementations, a process may be designed and created by a user such as a developer. In various implementations, the user may use planning model generation framework 14 of FIG. 1 and/or software deployment system 210 of FIG. 2 to create the process.

As shown user interface 500, the system enables the user to create a process 502 in a workspace 504 by dragging and dropping process elements such as process element 506 from a process element palette 508.

In this example implementation, process element 506 is a start node, where the system enables a user to initiate process 502 from a folder, where process 502 initiates when a document is received in the folder. As described herein, in some implementations, the process initiation event may be when any object such as a document is received at a process initiating folder. In some implementations, the process initiation event may be when the object such as the document is a process initiating file and is received at any folder.

In some implementations, user interface 500 includes a section 510, where the system enables the user to specify properties of the document received. For example, the system may ask the user how the user wants to manage the document. The user may specify to keep the document in place, where the system leaves the document where it was placed (e.g., in the folder). In some implementations, when selecting keep the document in place, the system may give the user the possibility of selecting if the user wants only the file, or if the user wants to provide access to the whole container folder. In some implementations, based on that decision, a virtual document or folder may be created on a composer application. As such, the user may manage different access levels.

In some implementations, when selecting options to copy or move, the system copies or moves the document to a folder that is already defined in the composer application. In some implementations, process element 506 may have a defined payload that will be wrapped in a custom business type (e.g., called "Document (Predefined Type)"), which contains the document metadata that the system sends.

Figure 6:
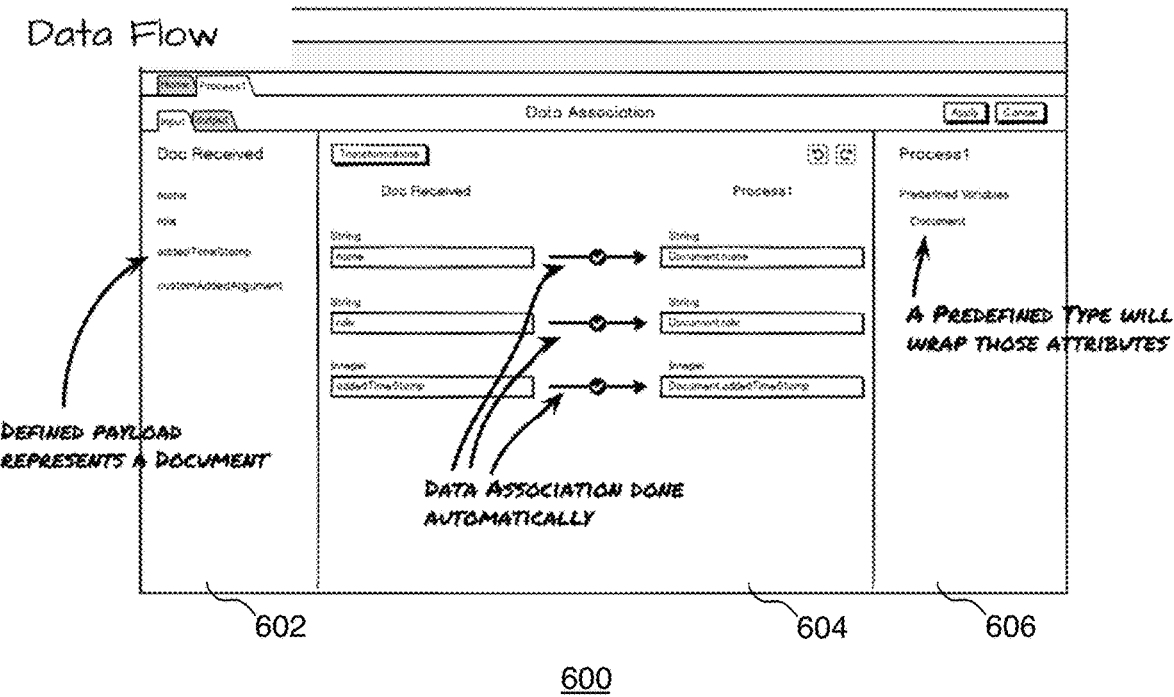
FIG. 6 illustrates an example user interface, according to some implementations.

FIG. 6 illustrates an example user interface 600, according to some implementations. As shown, user interface 600 includes a document received section 602, a transformation section 604, and a process section 606. In document received section 602, the system enables the user to define what a payload represents. In transformation section 604, the system automatically associates a given document with a process. In process section 606, the system wraps attributes with predefined variables.

Figure 7:
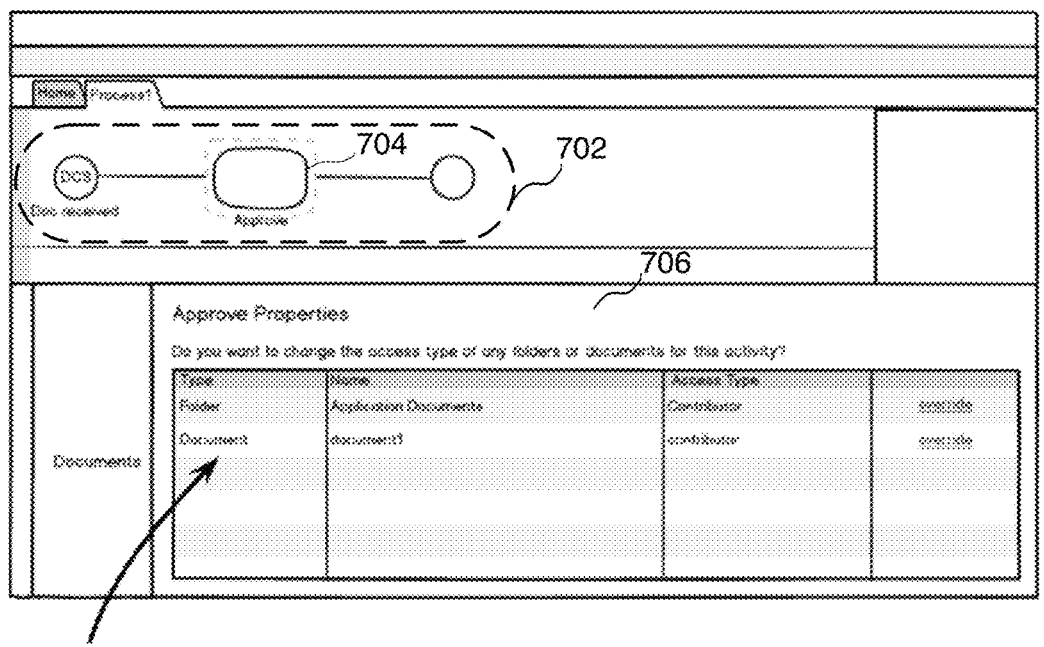
FIG. 7 illustrates an example user interface, according to some implementations.

FIG. 7 illustrates an example user interface 700, according to some implementations. As shown, user interface 700 displays a process 702 that includes a process element 704, among other elements. Process element 704 is a task process element, where an end user may approve an aspect (e.g., a loan application) in process 702. User interface 700 includes an approval section 706, where the system enables the user to modify access to a document in any particular user task. At a user task level, the system enables the user to change the default access to the folder/document.

When receiving a particular rest call (with the document payload) runtime will kickoff a process (this process may be binded in the system). In some implementations, the user will see the document if the defined access level allows the user to.

Figure 8:
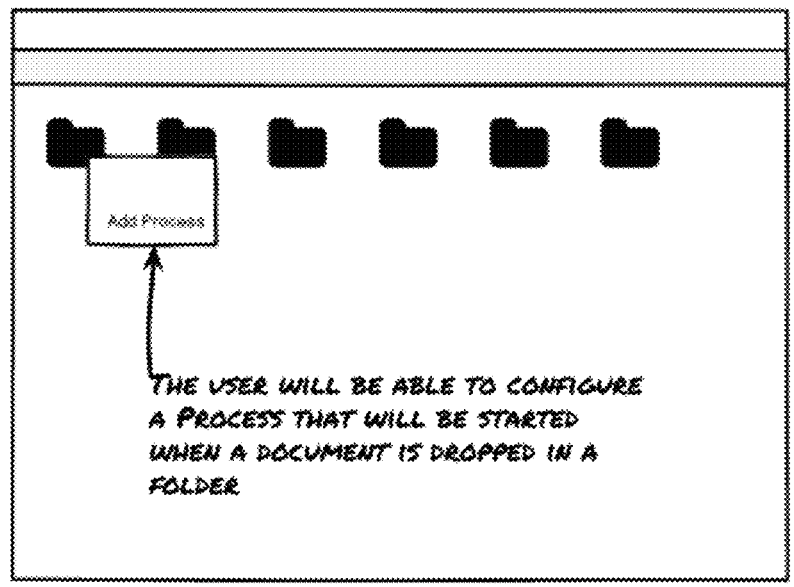
FIG. 8 illustrates an example user interface, according to some implementations.

FIG. 8 illustrates an example user interface 800, according to some implementations. As shown, the system enables a user to configure a process. For example, the system may enable the user to configure that a process will be initiated when a document is dropped in a folder.

The system enables a user to select a folder that the user manages, and enables the user to configure a binding process. After the user binds a process to that folder, every time a document is added to the folder, the process will be started with that particular documents/folder metadata as payload. When configuring a binding, the system may send a list of processes that can be initiated with a document, and the user may choose one of the processes.

Figure 9:
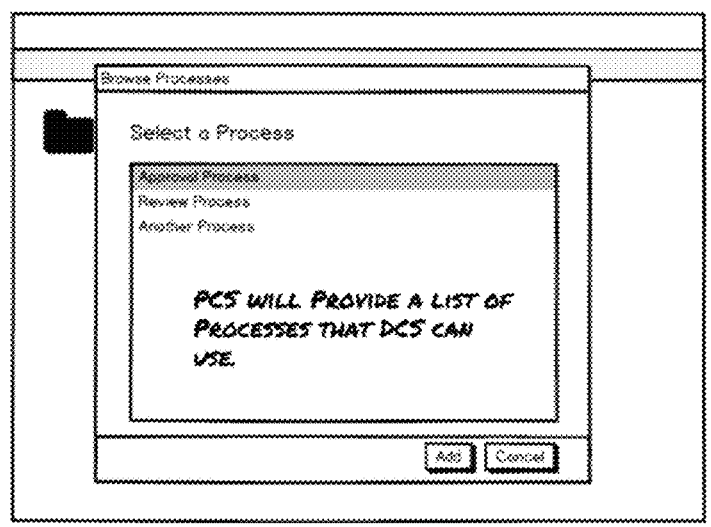
FIG. 9 illustrates an example user interface, according to some implementations.

FIG. 9 illustrates an example user interface 900, according to some implementations. As shown, the system may provide a user with a process to select. For example, the system may provide a list (e.g., approved process, review process, etc.) in a drop-down menu selectable by the user. In some implementations, when registering a folder, the system automatically shares the folder to a process cloud service (PCS) proxy user.

Figure 10:
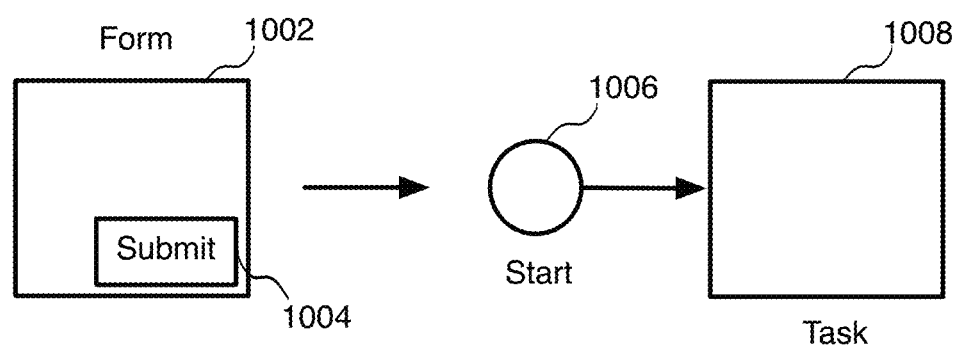
FIG. 10 illustrates an example block diagram of a process environment, according to some implementations.

FIG. 10 illustrates an example block diagram 1000 of a process environment, according to some implementations. As indicated herein, in some implementations, process initiation event is a user selecting a predefined activation control button on a form.

Shown in FIG. 10 is a form 1002. Form 1002 is displayed on a client device for the user to fill out. After the user finishes filling out the form, the user may then select or click on an activation control button to initiate the process. In this particular example, the predefined activation control button is a submit button 1004. This may be referred to as a form start event, which triggers a process instance when a user submits a form. In various implementations, the form is built to receive input from the end-user and present information relevant to the workflow. As the form is built, the system creates a business object to store the form data.

As described in more detail herein, the selection of submit button 1004 automatically initiates a start node 1006 of a process, which is initiated at the server. After the process is initiated at start node 1006, the next step of the process begins. In this example, the next step is at task node 1008.

Figure 11:
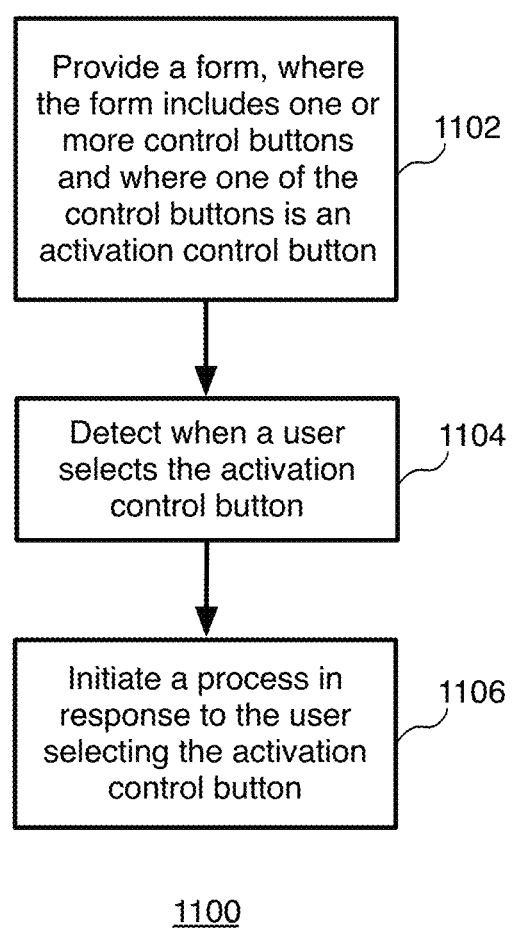
FIG. 11 illustrates an example flow diagram for form-based process initiation, according to some implementations.

FIG. 11 illustrates an example flow diagram 1100 for form-based process initiation, according to some implementations. Referring to both FIGS. 2 and 11, a method is initiated at block 1102, where a system such as a client device provides a form, where the form includes one or more control buttons. In various implementations, at least one of the control buttons is a predetermined activation control button.

An example form may be a travel request form. If the user were requesting a business trip to a particular destination (e.g., Argentina), the user may fill out a form and submit the form for approval. The user selecting the submit button would also initiate the associated process. The process may include approval task nodes, etc.

At block 1104, the system detects when a user selects the predetermined activation control button. In various implementations, the predetermined activation control button is a submit button. In various implementations, the activation control button is a send button.

At block 1106, the system initiates a process in response to the user selecting the predetermined activation control button. In various implementations, the process is initiated at a server device. As a result, instead of requiring an application programming interface (API) to initiate the process, the process is initiated simply by the user submitting the form. In other words, the initiation or trigger of the process is an integral part of the form, where the form is a part of the process life cycle.

While example implementations are described herein in the context of the activation control button being a submit button, the activation control button may be any one or more buttons that achieve the same trigger result. It is appropriate that the activation control button is a submit button where it makes sense for the user to complete a form entirely (e.g., provide all needed information) before initiating a process.

For examples of alternative activation control buttons, the activation control button may be a save button to submit a webform, a cancel button, etc.

In some implementations, where an activation control button is a save button, the user selecting the save button may create an instance of the process, yet not necessarily initiate the process. In some implementations, where the activation control button is not a save button, the information in the form may be simply saved, and not create an instance or initiate an associated process. This would avoid the creation of multiple instances or multiple initiations of a process each time the user saves (not submits) a form. In some implementations, the activation control button may be a cancel button.

In some implementations, the system may apply one or more policies to control authorization with respect to forms. For example, a policy may include a permission requirement that restricts users who can select an activation control button to employees. In some implementations, such permission may be extended to a customer user as opposed to consumer end user.

In some implementations, a process instance may be created by another flow element, or as a placeholder when an instance trigger is unknown, not specifically defined, or implemented later by process developers. This may be referred to as a none start event.

Other process initiation policies are possible. For example, in some implementations, one or more of the process initiation policies may include initiating a process if a message is received. Such a message may be sent from another business process or from a service. In some implementations, the message may be an email message. In some implementations, messages are types of data used to exchange information between processes. Just as data objects are used to define the data used within an application, messages may be used to define the data used between processes or between a process and a service.

In various implementations, the steps described herein may be implemented by developer computer system 12 of FIG. 1, where the system receives the process element information from another system such as planning model generation framework 14 of FIG. 1. The steps described herein may also be implemented by software deployment system 210 of FIG. 2.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 12:
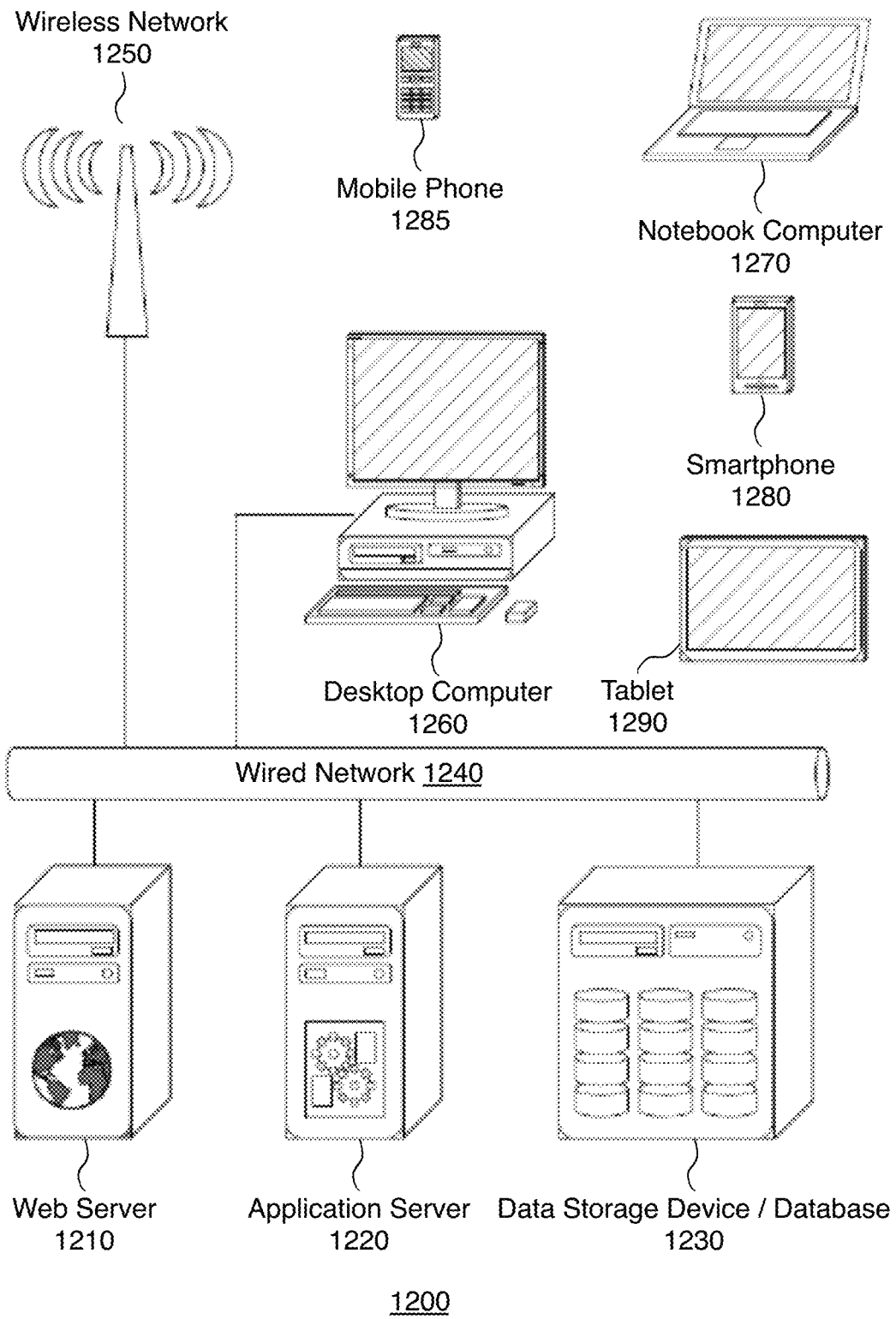
FIG. 12 illustrates an example block diagram of a system, which may be used for implementations described herein.

FIG. 12 illustrates an example block diagram of a system 1200, which may be used for implementations described herein. Example system 1200 is capable of supporting or running various hardware and/or software modules and associated methods discussed with reference to FIGS. 1-11. Note that certain implementations may be implemented using one or more standalone applications (for example, residing in a user device) and/or one or more web-based applications implemented using a combination of client-side and server-side code. While system 1200 performs implementations described herein, in other implementations, any suitable component or combination of components associated with system 1200 or any suitable processor or processors associated with system 1200 may facilitate performing the implementations described herein. In various implementations, system 1200 may not have all of the components shown and/or may have other elements including other types of components instead of, or in addition to, those shown herein.

General system 1200 includes user devices 1260-1290, including one or more desktop computers 1260, one or more notebook computers 1270, one or more smartphones 1280, one or more mobile phones 1285, and one or more tablets 1290. General system 1200 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although system 1200 is shown with five user devices, any number of user devices can be supported.

A web server 1210 is used to process requests from web browsers and standalone applications for web pages, electronic documents, enterprise data or other content, and other data from the user computers. Web server 1210 may also provide push data or syndicated content, such as RSS feeds, of data related to enterprise operations.

An application server 1220 operates one or more applications. The applications can be implemented as one or more scripts or programs written in any programming language, such as Java, C, C++, C#, or any scripting language, such as JavaScript or European computer manufacturers association script (ECMAScript), Perl, hypertext preprocessor (PHP), Python, Ruby, or tool command language (TCL). Applications can be built using libraries or application frameworks, such as Rails, Enterprise JavaBeans, or .NET. Web content may be created using hypertext markup language (HTML), cascading style sheets (CSS), and other web technology, including templating languages and parsers.

The data applications running on application server 1220 are adapted to process input data and user computer requests and can store or retrieve data from data storage device or database 1230. Database 1230 stores data created and used by the data applications. In some implementations, database 1230 includes a relational database that is adapted to store, update, and retrieve data in response to SQL format commands or other database query languages. Other implementations may use unstructured data storage architectures and Not Only SQL (NoSQL) databases.

In some implementations, application server 1220 includes one or more general-purpose computers capable of executing programs or scripts. In some implementations, web server 1210 is implemented as an application running on the one or more general-purpose computers. Web server 1210 and application server 1220 may be combined and executed on the same computers.

An electronic communication network 1240-1250 enables communication between user computers 1260-1290, web server 1210, application server 1220, and database 1230. In some implementations, networks 1240-1250 may further include any form of electrical or optical communication devices, including wired network 1240 and wireless network 1250. Networks 1240-1250 may also incorporate one or more local-area networks, such as an Ethernet network, wide-area networks, such as the Internet; cellular carrier data networks; and virtual networks, such as a virtual private network.

System 1200 is one example for executing applications according to some implementations. In some implementations, application server 1210, web server 1220, and optionally database 1230 can be combined into a single server computer application and system. In further implementations, virtualization and virtual machine applications may be used to implement one or more of application server 1210, web server 1220, and database 1230.

In still further implementations, all or a portion of the web and application serving functions may be integrated into an application running on each of the user computers. For example, a JavaScript application on the user computer may be used to retrieve or analyze data and display portions of the applications.

In various implementations, system 1200 may not have all of the components shown and/or may have other elements including other types of components instead of, or in addition to, those shown herein.

With reference to FIGS. 1, 2, and 12, developer system(s) 12, customer administrator system(s) 22, and customer end-user system(s) 24 of FIG. 1 may be implemented in whole or in part via one or more of desktop computer 1260, notebook computer 1270, smartphone 1280, mobile phone 1285, and tablet 1290 of FIG. 12 and/or other computing devices such as computing system 200 of FIG. 2. In some implementations, computing devices 1260-1290 run browsers, e.g., used to display developer UI(s) 26 and UIs of customer administrator system(s) 22 and customer end-user system(s) 24 of FIG. 1. Examples of such UIs are shown in FIGS. 3, 5, 6, 7, 8, and 9.

In some implementations, browsers of systems 12, 22, 24 of FIG. 1 connect to the Internet, represented by wired network 1240 and/or wireless network 1250 as shown in FIG. 12, to access one or more network-coupled servers, databases, and/or associated cloud-based functionality, as represented by modules 14-20 of FIG. 1. Note that one or more of web server 1210, application server 1220, and data storage device or database 1230 shown in FIG. 12 may be used to host software corresponding to modules 14-20 of FIG. 1, as detailed more fully below.

In some implementations, model artifact constructor 16, planning model generation framework 14 (including accompanying flex dimension framework 36, feature-artifact mapping module 38, runtime model generator 40, dynamic integrator 42, and UI generator 44), dynamic business planning module 18 and accompanying model adaptation module 46 (including model specifications 48, question generator 50, and answer incorporator 52), and packaging, delivery, deployment, and runtime system 20 (and accompanying cloud-deployed package 54) of FIG. 1 run in a cloud computing environment that includes a collection of plural web servers 1210, application servers 1220, and data storage devices 1230 shown in FIG. 12.

For example, in some implementations, planning model generation framework 14 and model artifact constructor 16 of FIG. 1 run on a process cloud that communicates with a document cloud via an integration mechanism, e.g., middleware, APIs, web services, etc. The document cloud maintains data storage devices 1230 of FIG. 12 to maintain data that is generated by customers, e.g., via customer end-user systems 24 of FIG. 1 through use of cloud-deployed package 54. The process cloud in combination with the document cloud act as an overall cloud that supports development, deployment, dynamic adaptation, and use of dynamic software applications and accompanying models (e.g., dynamic business planning model 18 of FIG. 1) shown in FIG. 1.

In general, software developers e.g., users of developer systems 12 of FIG. 1, may subscribe to certain cloud services to facilitate development of software applications and storage of associated files. A cloud service that is configured for software application or process flow development is called a process cloud service (PCS).

A process cloud service may employ a networked database, e.g., data storage device 1230 of FIG. 12 or database 220 of FIG. 2, to store files and other objects used by a given software program being developed. Server-side development environments may be accessible to developers via browsers. The development environments may be backed by the PCS, such that developed software application files are stored in the PCS database corresponding to the one or more of data storage devices 1230 of FIG. 12 or database 220 of FIG. 2.

A document cloud may include document management functionality in communication with folder structures, and documents and may incorporate functionality for adding rich metadata documents and folders. The document management functionality may include metadata services (MDS) for characterizing folders and documents and associated structures with various types of metadata. The document management functionality may further include software (which may include a combination of webpage code from web server 1210 of FIG. 12 and supporting application code of application server 1220 of FIG. 12, where the webpage code may call the application code using web services, APIs, etc.) for generating one or more customer UI display screens, e.g., UI display screens presented via browsers of customer administrator systems 22 and customer end-user systems 24 of FIG. 1.

In some implementations, the UI display screens (examples of which are shown in FIGS. 3, 5, 6, 7, 8, and 9) include accompanying UI controls and associated options. Example options include options to browse, create, delete, define, upload, download, etc., folders, structures, and documents, etc., as maintained via the folder structures and documents.

In some implementations, browsers used by developer system 12, customer administrator system 22, and customer end-user system 24 of FIG. 1, interface with web servers 1210 shown in FIG. 12 to access websites and accompanying webpage code, which is backed by applications used to implement modules 16-20 of FIG. 1. The webpage code of web servers 1210 of FIG. 12 uses web services, APIs, and/or other interfacing mechanisms to communicate with application software hosted on application servers 1220 of FIG. 12 of the cloud, which includes a collection of web servers 1210, application servers 1220, and data storage devices 1230 of FIG. 12.

Various implementations discussed herein may provide substantial benefits in terms of providing efficiencies in systems and methods that achieve a new and useful end as they pertain to new software adaptability. In particular, certain implementations discussed herein uniquely leverage input from customers, the input of which may change over time as user needs change, to enable substantial hereto-for-not possible or practical dynamic software model reconfiguration and/or reconstruction.

Certain implementations may provide virtually automatic incorporation of such inputs into a seamlessly adaptable software package that is responsive to the changing user needs and automatically seamlessly handles software integrations.

Accordingly, various implementations provide new capabilities for efficient software adaptation, in part by uniquely leveraging associations between user-provided answers to questions, sets of software model artifacts, sets of software functionality, and mappings or relationships.

Figure 13:
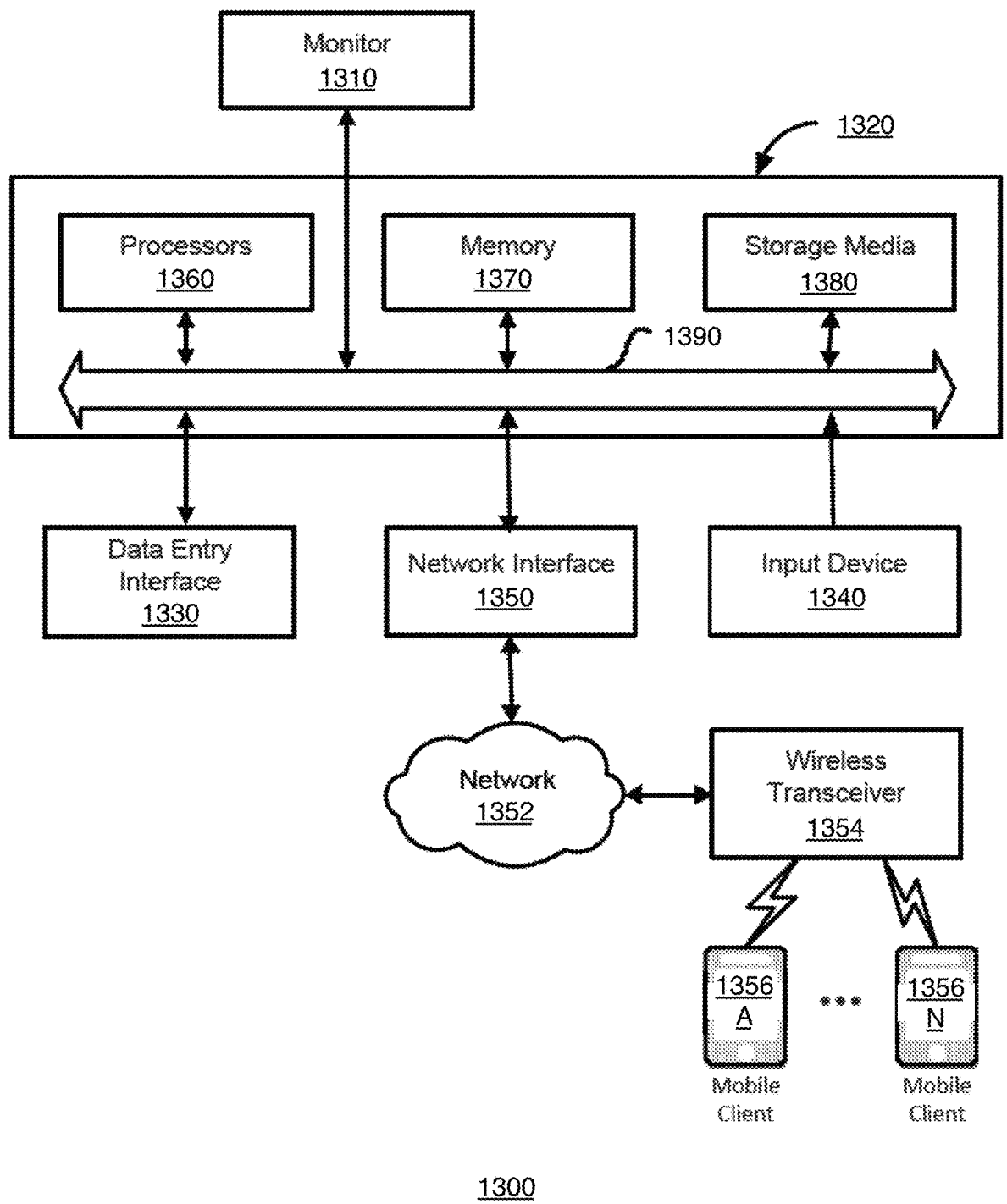
FIG. 13 illustrates an example block diagram of a network environment, which may be used for implementations described herein.

FIG. 13 illustrates an example block diagram of a network environment 1300, which may be used for implementations described herein. Network environment 1300 is merely illustrative and not intended to limit the scope of the claims. One of ordinary skill in the art would recognize other variations, modifications, and alternatives. For example, network environment 1300 may be implemented in a distributed client-server configuration having one or more client devices in communication with one or more server systems.

In one exemplary implementation, network environment 1300 includes a display device such as a monitor 1310, a computer 1320, a data entry interface 1330 such as a keyboard, touch device, and the like, an input device 1340, a network interface 1350, and the like. Input device 1340 is typically implemented as a computer mouse, a trackball, a track pad, wireless remote, tablet, touch screen, and the like. Moreover, input device 1340 typically allows a user to select and operate objects, icons, text, characters, and the like that appear, for example, on the monitor 1310.

Network interface 1350 may include an Ethernet card, a modem (telephone, satellite, cable, integrated services digital network (ISDN), etc.), an (asynchronous) digital subscriber line (DSL) unit, and the like. Furthermore, network interface 1350 may be physically integrated on the motherboard of computer 1320, may be a software program, such as soft DSL, or the like.

Network environment 1300 may also include software that enables communications over communication network 1352 such as the hypertext transfer protocol (HTTP), transmission control protocol/Internet protocol (TCP/IP), real-time transport protocol/real-time streaming protocol (RTP/RTSP), protocols, wireless application protocol (WAP), Institute of Electrical and Electronics Engineers (IEEE) 802.11 protocols, and the like. In addition to and/or alternatively, other communications software and transfer protocols may also be used, for example Internetwork packet exchange (IPX), user datagram protocol (UDP) or the like.

Communication network 1352 may include a local area network, a wide area network, a wireless network, an Intranet, the Internet, a private network, a public network, a switched network, or any other suitable communication network, such as for example cloud networks. Communication network 1352 may include many interconnected computer systems and any suitable communication links such as hardwire links, optical links, satellite or other wireless communications links such as Bluetooth, WIFI, wave propagation links, or any other suitable mechanisms for communication of information. For example, communication network 1352 may communicate to one or more mobile wireless devices 1356A-N, such as mobile phones, tablets, and the like, via a base station such as wireless transceiver 1354.

Computer 1320 may include familiar computer components such as one or more processors 1360, and memory storage devices, such as a memory 1370, e.g., random access memory (RAM), storage media 1380, and system bus 1390 interconnecting the above components. In one embodiment, computer 1320 is a PC compatible computer having multiple microprocessors, graphics processing units (GPU), and the like. While a computer is shown, it will be readily apparent to one of ordinary skill in the art that many other hardware and software configurations are suitable for use with implementations described herein. While computer 1320 performs implementations described herein, in other implementations, any suitable component or combination of components associated with computer 1320 or any suitable processor or processors associated with computer 1320 may facilitate performing the implementations described herein. In various implementations, computer 1300 may not have all of the components shown and/or may have other elements including other types of components instead of, or in addition to, those shown herein.

Memory 1370 and Storage media 1380 are examples of non-transitory tangible media for storage of data, audio/video files, computer programs, and the like. Other types of tangible media include disk drives, solid-state drives, floppy disks, optical storage media such as compact disc-read only memory (CD-ROMS) and bar codes, semiconductor memories such as flash drives, flash memories, read-only-memories (ROMS), battery-backed volatile memories, networked storage devices, cloud storage, and the like.

Although the description has been described with respect to particular embodiments thereof, these particular embodiments are merely illustrative, and not restrictive. For example, while various implementations discussed herein address development, deployment, and use of dynamic business planning models used to implement cloud-based enterprise software applications and associated services, implementations are not limited thereto.

Various implementations need not be deployed via an Internet cloud, but instead may be hosted on an internal enterprise server on a local network. Furthermore various implementations may be implemented as desktop software, such that the incremental updating happens on the end-user computer on which the software leveraging the dynamic planning model runs. In addition, implementations are not limited to use in conventional business applications and computing environments, and may be used, for example, by governments, universities, and other organizations to facilitate various types of planning activities. In addition, implementations need not be limited to planning software, but may be used to dynamically update different types of software that may benefit by the ability to dynamically adapt to specific needs and/or changing needs of an organization and/or associated computing environment.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable storage medium carrying program instructions thereon, the instructions when executed by one or more processors cause the one or more processors to perform operations comprising:
   receiving, at a location at a document server, at least one document object or a folder object that contains the at least one document object from a client device, wherein the document object includes a fillable webform for a user of the client device to fill out and having an activation control button, wherein the fillable webform is associated with a control authorization policy to specify users authorized to select the activation control button;
   receiving a user-configured process selected from a list of available business processes received from a process server, wherein the user-configured process is configured by a user interface displaying a process indicator comprising two or more process elements, and wherein a process element of the two or more process elements includes one of a task node, a start node, or an end node;
   determining an instance of a process initiation event, wherein the process initiation event triggers the user-configured process to initiate, and wherein the process initiation event is based on receipt of the at least one document object or the folder object in response to the webform being filled out and user selection of the activation control button on the webform to submit the fillable webform, wherein the user selection is determined to be an authorized user according to the control authorization policy;

receiving a user-configured document management property specifying that the received at least one document object or folder object is maintained at the location and a virtual document object or virtual folder object is created;

receiving user-configured permissions for the at least one document object or the folder object, based on a particular task of the task node of the user-configured process, wherein the user-configured permissions are configured by an access section of the user interface displaying the process indicator and restrictions on which users are enabled to perform the particular task with the at least one document object or the folder object, wherein the at least one document object or folder object is accessed by providing the created virtual document object or virtual folder object to the users enabled to perform the particular task; and in response to determining the instance of the process initiation event, initiating the user-configured process upon the determining of the process initiation event by sending metadata of the at least one document object or the folder object as payload to the process server to launch the process.

2. The computer-readable storage medium of claim 1, wherein the at least one document object or the folder object is a document object and wherein the process initiation event is the document object being a predefined process initiating file and being received at any folder.

3. The computer-readable storage medium of claim 1, wherein sending metadata of the at least one document object or the folder object includes:
extracting data from the at least one document object or the folder object;
associating data types of the data with respective predefined data types of the process server; and
wrapping attributes of the data with the respective predefined data types.

4. The computer-readable storage medium of claim 1, wherein the task node is a user approval task and the user-configured process includes approval of the filled out portions of the webform.

5. A method for process initiation, the method comprising:
receiving, at a location at a document server, at least one document object or a folder object that contains the at least one document object from a client device, wherein the document object includes a fillable webform for a user of the client device to fill out and having an activation control button, wherein the fillable webform is associated with a control authorization policy to specify users authorized to select the activation control button;
receiving a user-configured process selected from a list of available business processes received from a process server, wherein the user-configured process is configured by a user interface displaying a process indicator comprising two or more process elements, and wherein a process element of the two or more process elements includes one of a task node, a start node, or an end node;
determining an instance of a process initiation event, wherein the process initiation event triggers the user-configured process to initiate, and wherein the process initiation event is based on receipt of the at least one document object or the folder object in response to the webform being filled out and user selection of the activation control button on the webform to submit the fillable webform, wherein the user selection is determined to be an authorized user according to the control authorization policy;

receiving a user-configured document management property specifying that the received at least one document object or folder object is maintained at the location and a virtual document object or virtual folder object is created;

receiving user-configured permissions for the at least one document object or the folder object, based on a particular task of the task node of the user-configured process, wherein the user-configured permissions are configured by an access section of the user interface displaying the process indicator and restrictions on which users are enabled to perform the particular task associated with the at least one document object or the folder object, wherein the at least one document object or folder object is accessed by providing the created virtual document object or virtual folder object to the users enabled to perform the particular task; and in response to determining the instance of the process initiation event, initiating the user-configured process upon the determining of the process initiation event by sending metadata of the at least one document object or the folder object as payload to the process server to launch the process.

6. The method of claim 5, wherein the at least one document object or the folder object is a document object and wherein the process initiation event is the document object being a predefined process initiating file and being received at any folder.

7. The method of claim 5, wherein sending metadata of the at least one document object or the folder object includes:
extracting data from the at least one document object or the folder object;
associating data types of the data with respective predefined data types of the process server; and
wrapping attributes of the data with the respective predefined data types.

8. The method of claim 5, wherein the task node is a user approval task and the user-configured process includes approval of the filled out portions of the webform.

9. An apparatus comprising:
one or more processors; and
logic encoded in one or more non-transitory computer-readable storage media for execution by the one or more processors and when executed operable to perform operations comprising:
causing one or more documents and one or more folders to be displayed in a workspace region in a user interface of a client device;
detecting a first document of the documents being received at a first folder of the one or more folders at a location, wherein the first document includes a fillable webform for a user of the client device to fill out and having an activation control button, wherein the fillable webform is associated with a control authorization policy to specify users authorized to select the activation control button;
receiving a user-configured process selected from a list of available business processes received from a process server, wherein the user-configured process is configured by a user interface displaying a process indicator comprising two or more process elements, and wherein a process element of the two or more process elements includes one of a task node, a start node, or an end node;

determining an instance of a process initiation event, wherein the process initiation event triggers the user-configured process to initiate, and wherein the process initiation event is based on receipt of the first document in response to the webform being filled out and user selection of the activation control button on the webform to submit the fillable webform, wherein the user selection is determined to be an authorized user according to the control authorization policy;

receiving a user-configured document management property specifying that the received first document is maintained at the location and a virtual document object is created;

receiving user-configured permissions for the first document, based on a particular task of the task node of the user-configured process, wherein the user-configured permissions are configured by an access section of the user interface displaying the process indicator and restrictions on which users are enabled to perform the particular task with the first document, wherein the first document object is accessed by providing the created virtual document object to the users enabled to perform the particular task; and in response to determining the instance of the process initiation event, initiating the user-configured process by sending metadata of the first document as payload to the process server to launch the process.

10. The apparatus of claim 9, wherein the first document is a predefined process initiating file that is associated with the process, and wherein the process initiation event is the predefined process initiating file being received at any folder.

11. The apparatus of claim 9, wherein the process initiation event is the first document being received at the first folder, wherein the first folder is a predefined process initiating folder that is associated with the process.

12. The apparatus of claim 9, wherein the process initiation event is the first document being received at the first folder, wherein the first document is a predefined process initiating file that is associated with the process.

13. The apparatus of claim 9, wherein sending metadata of the first document includes:
  extracting data from the first document;
  associating data types of the data with respective predefined data types of the process server; and
  wrapping attributes of the data with the respective predefined data types.

14. The apparatus of claim 9, wherein the task node is a user approval task and the user-configured process includes approval of the filled out portions of the webform.

* * * * *